Patented Apr. 28, 1936

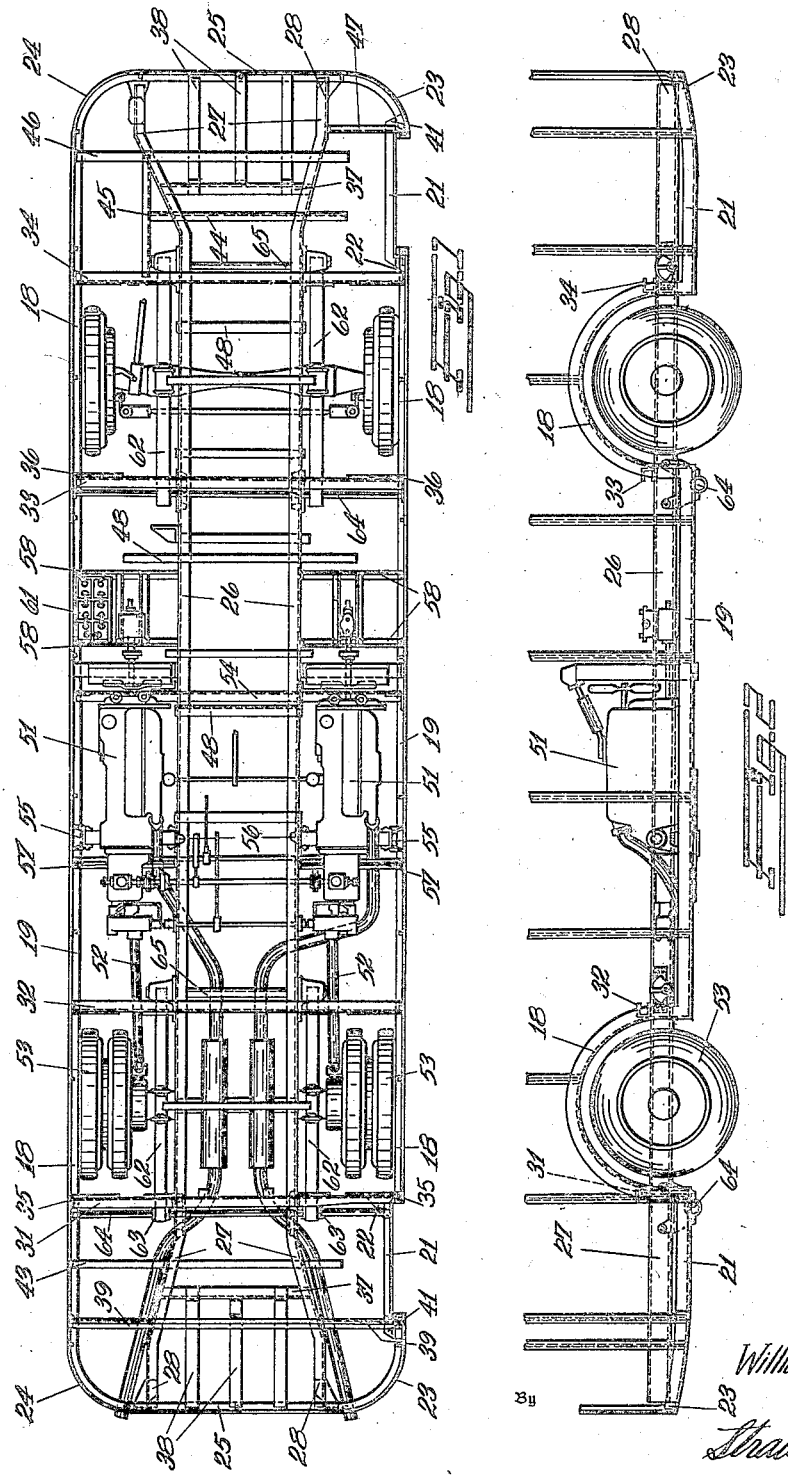

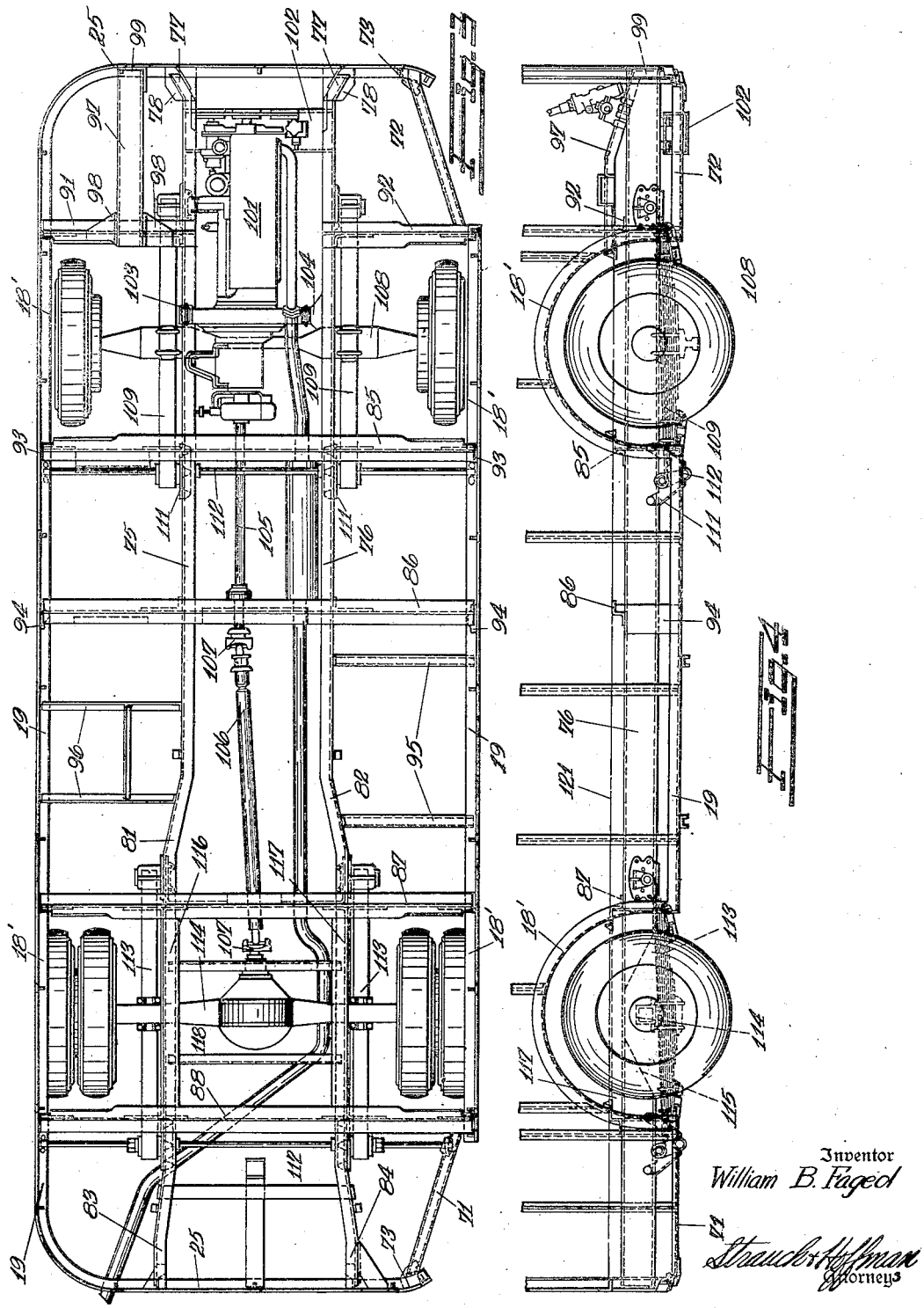

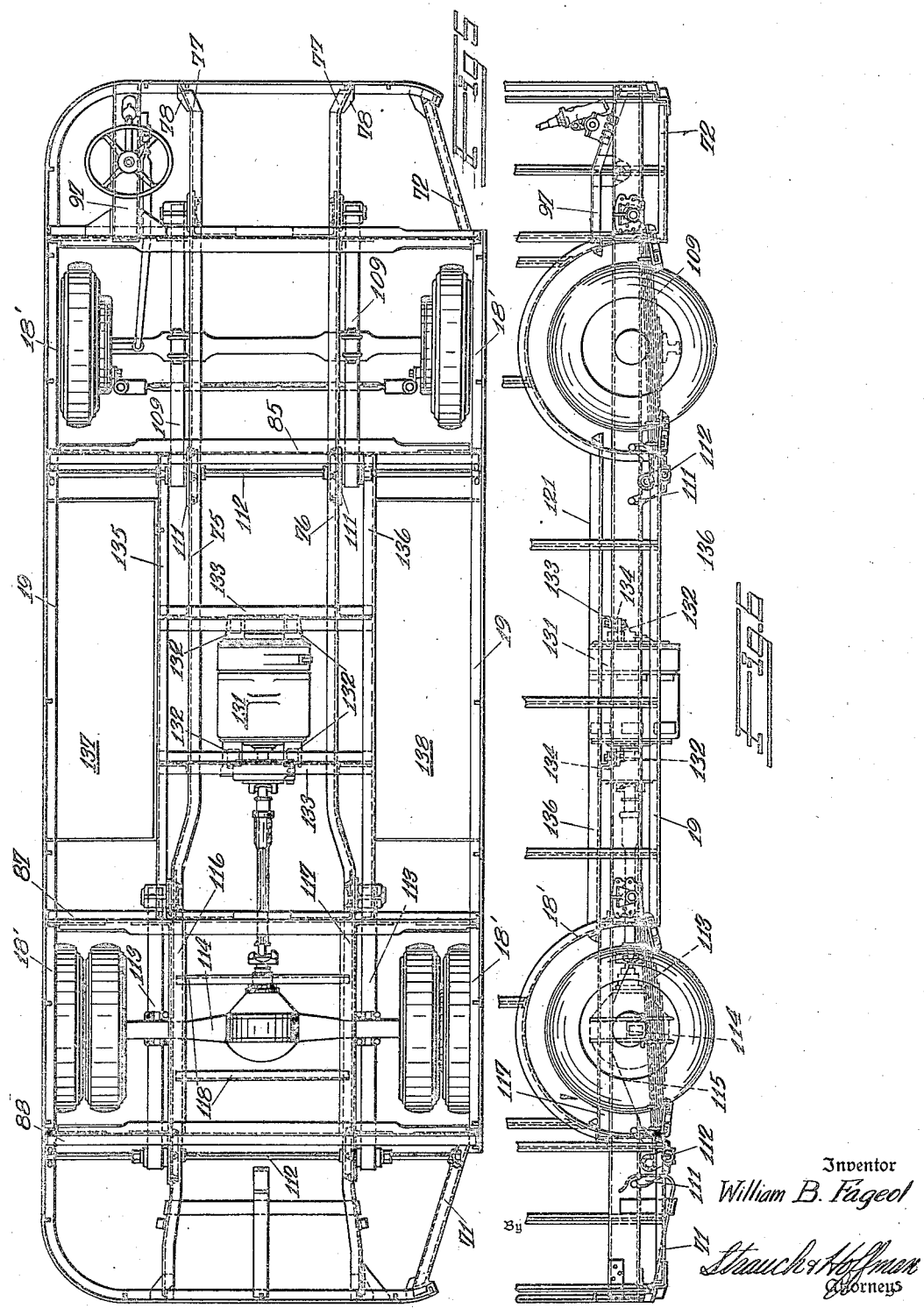

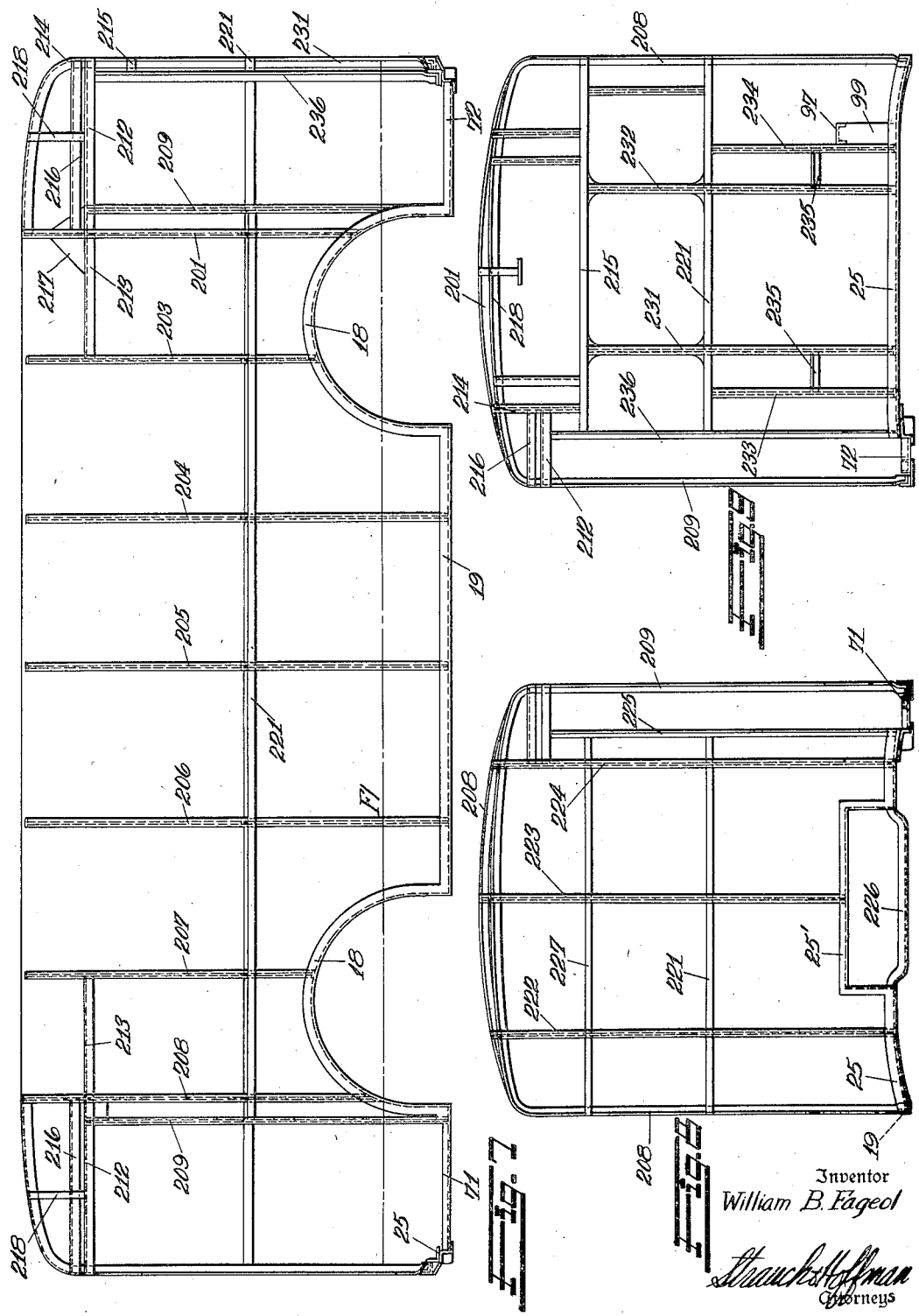

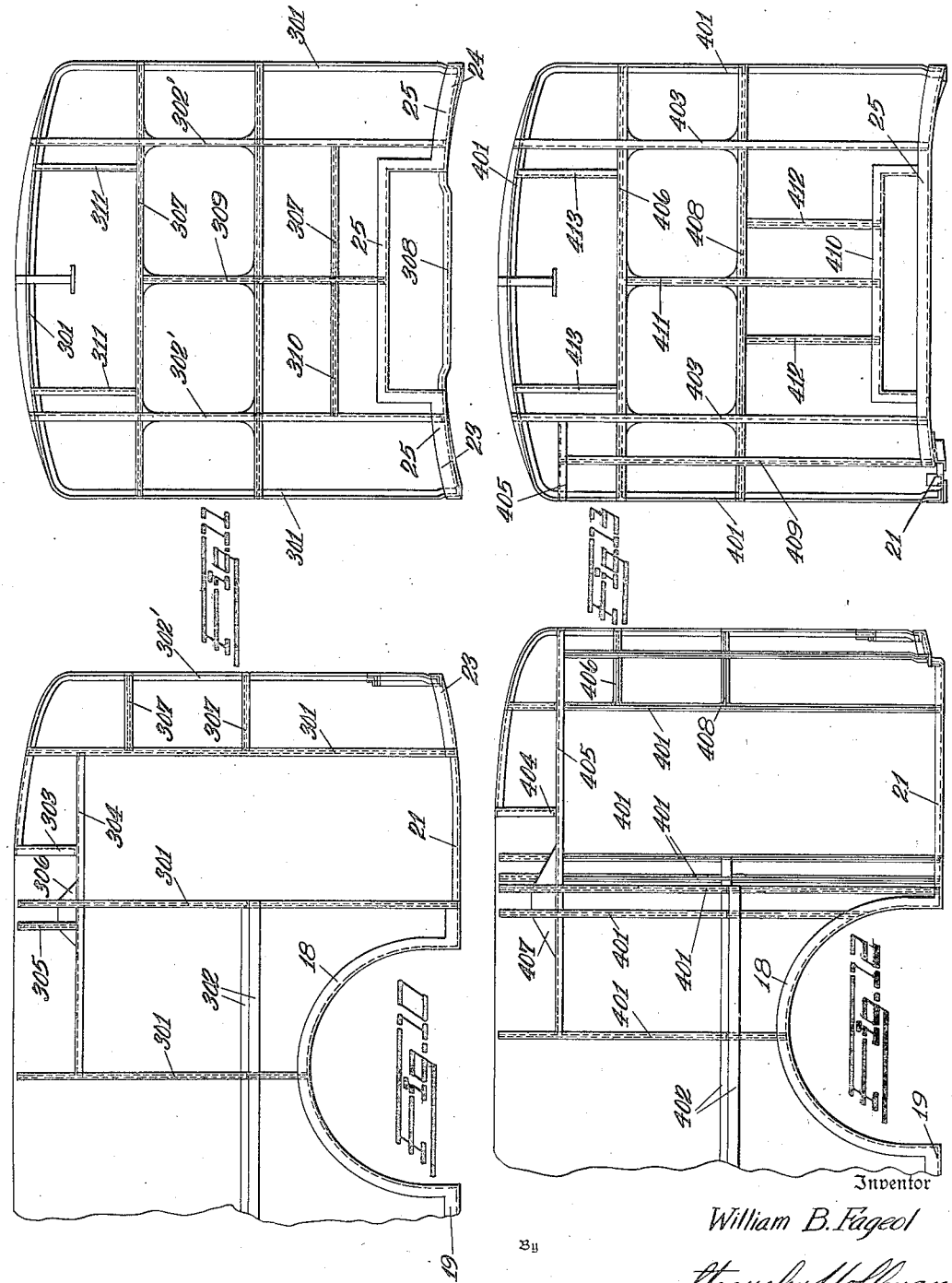

2,039,215

UNITED STATES PATENT OFFICE 2,039,215

ROAD VEHICLE BODY FRAME CONSTRUCTION

William B. Fageol, Kent, Ohio, assignor to Twin Coach Company, Kent, Ohio, a corporation of Delaware Application May 3, 1932, Serial No. 608,971

8 Claims. (Cl. 296—28)

This invention relates to a vehicle body construction, and more particularly to the base frame thereof and the relation of the sides, ends and roof of the body thereto. One object of this invention is to provide a light-weight practical vehicle body construction particularly adapted for the carrying of passengers.

One object of the present invention is to provide a symmetrical vehicle body of the above type, which is extremely light in weight, provides the maximum available space for the carrying of passengers and their luggage, and having a very low center of gravity, and wherein the weight of the vehicle both loaded and unloaded is balanced with respect to the axles and wheels.

Another aim of the present invention is to provide a passenger-carrying vehicle of the above indicated type in which the use of the usual relatively heavy chassis frame construction is avoided, by utilizing the base of the body, rather than a heavy chassis frame, to support the power plant and for the attachment of the springs that connect the body directly to the axles.

The present invention also aims to provide a relatively light base frame made of relatively light-weight structural members, in which the base frame is not designed alone for withstanding the load to be imposed upon the vehicle, but in which reliance is placed upon the body framing members to reinforce the relatively light base frame members, so that the combined structure is capable of withstanding maximum loads though of very light total weight.

Another object of the invention is to provide a road vehicle body which is substantially lighter in weight than prior constructions, and in which the structural members thereof are materially reduced in size and weight, so that the vehicle is cheaper to build and materially lighter in weight and therefore more economical in operation.

A further aim of the present invention is to provide a passenger carrying vehicle having a base frame of relatively light framing members, the base frame being rigidly united to the sides, ends and roof frame elements, also formed of resiliently light members, the frame and body being so constructed and united that they reinforce the other, and in which portions of the base frame are curved upwardly to provide wheel recesses enabling the unitary body to be brought relatively close to the ground, to facilitate the entry of passengers therein and to provide a low construction permitting safe operation at high speed.

Another aim of the present invention is to provide a passenger carrying vehicle body formed especially for use in a road vehicle having a low center of gravity and low floor line, having portions of the base frame interrupted so as to permit step wells to be formed adjacent the ends of the vehicle so that passengers may step directly to the floor level, which, preferably extends unobstructed throughout the length of the vehicle.

Another object of the invention is to provide a passenger carrying road vehicle body of substantially uniform height and width from end to end, constructed so that the base, roof, side and end frame elements mutually strengthen each other by virtue of their integral connection into a box-like frame for the body, capable of supporting the power plant and vehicle accessories, and capable of having the axles directly connected thereto without the use of customary chassis frame.

The present application is a continuation in part of application #355,755, filed April 17, 1929, application 494,393 filed November 8, 1930, now Patent No. 1,861,002 and application 496,545 filed November 18, 1930.

The above and further objects of the invention will be apparent from the following detailed description and appended claims when taken in conjunction with the drawings wherein:

Figure 1 is a plan view of one embodiment of the base frame construction, with the body framing members connected therewith, Figure 2 is a side elevation of the embodiment shown in Figure 1, Figure 3 is a modified form of base construction, Figure 4 is a side elevation of the base frame of Figure 3, Figure 5 is a plan view of another modification of a base frame, particularly adapted for receiving an electric motor operated by electric current from a distant power plant, and known as a trackless trolley, Figure 6 is a side elevation of the base frame of Figure 5, Figure 7 is a side elevation of a body construction as assembled and united with one of the base frame constructions, Figure 8 is a rear elevation of the body shown in Figure 7, Figure 9 is a front elevation thereof, Figure 10 is a broken elevation of the front of a slightly modified form of body construction, Figure 11 is a front elevation of the embodiment shown in Figure 10, Figure 12 is a view similar to Figure 10 showing a further modified form, and Figure 13 is a front elevational view thereof.

Referring to the drawings wherein like reference characters indicate like parts, and particularly to Figures 1 and 2, it will be seen that the base frame of the body of this form of the invention comprises an elongated rectangular base frame extending from end to end of the vehicle, and forming the base of a body which is coextensive with the frame. The base frame comprises two pairs of longitudinally disposed and transversely spaced arched wheel housing frame members 18. Members 18 on each side of the base frame are connected by straight angle bars 19, preferably welded thereto. On the right side of the vehicle there are provided two entrance doors, which, as seen in Figure 1, are preferably arranged between the front and the rear axles and the front and rear ends of the vehicle. The folding doors at these entrance ways are preferably arranged flush with the sides of the vehicle when closed, and a step well is provided for the doors. These step wells are supported by short angle bar frame members 21 each secured adjacent one end to a wheel housing member 18 by a bracket 22. The other ends of the step angle members 21 are rigidly connected to the curved portions 23 of angle bar frame members including straight portions 25 and curved portions 24 that are arranged in the planes of the ends and corners of the body of which the frame members just described constitute the base.

The frame members just described which, except for the members 21, are located in the planes of the sides, corners, and ends of the body of which they are a part, are disposed on and rigidly secured to the ends of a pair of longitudinally extending frame members 26 that are widely spaced apart and parallel at their mid portions, but that diverge adjacent each end of the body as shown at 27 and then continue in parallelism to the ends of the body, the last named parallel portions being designated by the numeral 28. The frames are thus formed to stiffen the base frame at the corners of the body and to, at the same time, provide space therebetween to carry spare tires as hereinafter pointed out.

The longitudinally extended channel members 26 are further rigidly secured to the frame members that bound the body, namely, the wheel housing frame members 18, longitudinal members 19, and the angle bar portions 23, 24, 25, by a plurality of relatively light transverse frame members. Four of these transverse members comprise channel bars 31, 32, 33 and 34, which rest, on the central channels 26 and are secured thereto by suitable brackets or the like. The ends of said bars extend into the angle formed by the wheel housing angle bars and are rigidly secured to members 18 in any approved manner. For example, the member 31 may be secured to the wheel housing 18 adjacent the rear door by the supporting plate 35, its opposite end also being secured by a plate 35. The transverse member 32 may be directly welded to the two opposite wheel housings 18. Member 33 may be secured in position by gusset plates 36, and the front transverse member 34 may be directly welded to the wheel housing members 18. The front transverse member 34 is preferably connected to the wheel housing adjacent the front door by a supporting plate similar to plate 35.

In addition to the transverse members thus far described, other relatively light transverse framing members connect the channels 26 together and also connect the channels to the peripheral frame. For example, front and rear adjacent the ends of the vehicle a transverse framing member 37 is joined to the diverging portion 27 of the channel 26, and a plurality of short longitudinal framing members 38 connect the transverse members 37 to the front and rear peripheral frame member 25. The framing members 37 and 38, in addition to bracing the rear end of the vehicle frame, provide a supporting frame for the reception of vehicle accessories, such as spare tires or the like.

Just to the rear of the rear entrance door, a transverse framing member 39 is provided having Z or similar form which is joined to the portions 27 of the channels 26 and to the peripheral frame members 23 and 24. It will be noted from Figure 1 that the frame members at the corners of the base frame are joined by stiffening plates 41 thus strengthening the frame at the door openings.

As previously stated, the vehicle is provided with a depressed entrance well or step which is one step from the ground and another step below the floor level of the vehicle. In order to further brace the framing construction at the door well, and to fully support the depressed step, a transverse framing member 43 is secured to the angle member 19 and extends beneath the two channels 27 and is secured thereto and has its end projecting within the space defining the rear step well. A similar member 44 is positioned at the front of the vehicle, but member 44 may be connected to a short longitudinal framing member 45, which in turn is secured at one end to the transverse channel 34, and its other end to a transverse member 46. Member 46 is secured at one end to the peripheral angle bar 19 and its other end projects also into the step well at the front of the vehicle for supporting the upper step thereof. The front step well is further defined by a short transverse angle bar member 47, secured to plate 41 which connects the inset step well member 21 and the curved peripheral member 23. The opposite end of transverse member 47 is connected to the longitudinal channel member 28.

Further transverse frame members 48 are distributed longitudinally of the vehicle, and connect the two longitudinal channel members 26. The space between the longitudinal channels 26 and the peripheral members 19 may be utilized as a storage department for accessories of the vehicle. Therefore in some instances the transverse members 48 extend beyond the channel 26 to serve as additional supports for any purpose.

The embodiment of the invention just described, serves to provide an open frame that is especially well adapted to support two internal combustion engines positioned within the confines of the vehicle and supported on opposite sides of the base frame. These internal combustion engines 51 are operatively connected by drive shafts 52 to the rear wheels 53. The exhaust pipes for the engines are supported beneath the transverse frame members and extend above the rear axle which may be of the drop axle type. Additional supporting frame members may be provided for carrying the weight of the internal combustion engines 51. For example, additional bracing including transverse member 54 which extends beneath and is supported from the longitudinal channels 26 by suitable supporting brackets or gusset plates, may be used. Member 54 is welded or otherwise secured to the peripheral angle bar frame 19. The motors 51 may be mounted on brackets 55 secured to the peripheral frame 19, and the brackets 56 carried by the channels 26. The rear portion of the motor mountings are further braced by auxiliary transverse members 57 having one end secured to channel 26 by suitable brackets, the other end being connected to peripheral members 19, also by brackets or gusset plates. Forwardly of the engines 51 further transverse angle members 58 are supported from the channel 26 and the peripheral angle bars 19 for supporting the auxiliary portions of the vehicle such as the battery 61.

The body frame is connected to the front and rear axles by springs 62, the rear springs being connected at their rear ends by spring shackles 63, which are in turn, pivotally supported on a shackle bar 64. Shackle bar 64 is detachably secured to the two longitudinal channel members 26 by suitable depending brackets, and is also secured to the peripheral member 19 and member 21. The ends of shackle bar 64 may have grooves formed therein and U-bolts may engage in these grooves and be secured to the peripheral frame members 19 and 21, to removably support the bar 64. By the provision of a shackle bar 64, detachably secured to the base frame construction in the manner disclosed, not only is a convenient spring shackle pivot supporting member provided, but bar 64 additionally functions to provide a further brace for the base frame construction. A similar bar 64 is provided on the front axle assembly to support the front spring.

At their forward ends the springs 62 are directly pivoted to the base frame by spring hangers directly secured to a cross bar 65, that further braces the construction at this point.

The base frame as thus far described is extremely light in weight in comparison to the prior heavy constructions provided for vehicles of this nature. It is not, however, intended to carry the load of the vehicle, except when combined with a body construction which reinforces the base frame to provide the necessary rigidity and strength to the completed structure. The base frame herein disclosed may be associated with various types of body constructions, such as delivery trucks, busses, or trackless trolleys, so long as the body constructions are of the type which reinforce the base frame construction, and in turn are reinforced by the base frame. As hereinafter disclosed, the base frame of this application is described in conjunction with a passenger carrying vehicle having the body frame member so arranged as to form a box-like structure in which the frames of the sides, ends and roof serve as truss-like strengthening means for the base frame.

The body construction will be described subsequent to the description of the modified forms of the base frame construction.

Referring now to Figures 3 and 4, there is disclosed a modified form of vehicle base frame and body which however involves substantially the basic inventive thought underlying the arrangement hereinbefore described, namely, the use of a relatively light base frame structure subsequently rigidly united with a body frame structure resulting in a box-like vehicle the sides, ends, and roof of which mutually brace each other and the base frame. In this form of the invention, the wheel housing members 18' are formed of angle bars and an angle bar member 19 extends along opposite sides of the vehicle substantially in the plane of the sides of the completed vehicle. In this embodiment of the invention however the wheel housings 18' and the longitudinal members 19 are preferably integrally formed, the angle member being bent upwardly to form the wheel housings 18'. The upper or left hand member 19 curves at its end and said ends are turned into the planes of the end of the vehicle to form the end frame members arranged in the planes of the ends of the vehicle, these ends being designated by numeral 25. The peripheral member 19 on the right side of the vehicle is interrupted adjacent the end of the body for the convenient formation of suitable entrance and exit openings to the body and for the convenient attachment of step wells at the entrance and exit. To this end, additional frame members 71 and 72 are positioned across the doorway. These auxiliary frame members 71 and 72 may be channel bars with the webs thereof facing downwardly and at their front and rear ends, channels 71 and 72 rest upon connecting plates 73. The supporting gusset plate 73 is substantially Z-shaped in cross section and is secured to the end frame members 25. The inset frame members 71 and 72 are secured at their inner ends to transverse members of the base frame by way of suitable gusset plates, not shown in detail.

Within the confines of peripheral frame members 19 are two longitudinal channel frame members 75 and 76, which, as seen in Figure 3, are bowed outwardly as at 77 at the front of the vehicle and are secured by gusset plates 78 to the front angle member 25. The channel members 75 and 76 are also bowed outwardly just forward of the rear axle as at 81 and 82, and then continue parallel to one another, except that at the rear end of the vehicle where they are again bowed outwardly at 83 and 84, terminating in the parallel sections at the rear of the vehicle, which are secured to the rear peripheral frame member 25 by suitable gusset plates.

It will be noted from inspection of Figure 4, that the channel members 76 are positioned in a plane above the peripheral frame members 19, members 19 being substantially in the same plane as the inset step well members 71 and 72 and the front and rear frame members 25. Angle bar or similar transverse members 85, 86, 87 and 88 extend completely across the vehicle and rest on and are suitably secured to the channel members 75 and 76 by gusset plates or by directly welding the same thereto. Similar and shorter frame members 91 and 92 are positioned near the front of the vehicle to connect the channels 75 and 76 with the peripheral frame 19. The front members 91 and 92 are connected to the wheel housing 18 by suitable brackets or supporting plates. Members 91 and 92 rest upon the channels 75 and 76 and are secured thereto. Transverse member 85 is also secured at its ends to the wheel housing 18' by supporting plates, these plates 93 preferably extending downwardly to the lower peripheral member 19 and resting on one of the flanges thereof and being secured thereto. The central transverse member 86 is supported at its ends from the peripheral angle members 19 by supporting plate 94, and rests on and is secured to the channels 75 and 76. The two rear transverse members 87 and 88 are secured to the rear wheel housings 18 by brackets similar to bracket 93.

On the right side of the vehicle two auxiliary transverse frame members 95, preferably of channel formation, are secured to the central channel member 76 and the peripheral member 19, and similar auxiliary frame members 96 are secured on the opposite side of the vehicle and connect the peripheral frame member 19 with the channel 75. In order to rigidly support the steering column of the vehicle which is placed closely adjacent the front thereof and at the left hand corner of the vehicle, an auxiliary framing member 97 preferably of channel form is used. As seen in Figure 3, the channel 97 rests on and is secured to the short transverse member 91 by suitable plates 98, and the front end of the channel 97 is turned downwardly so that its lower end 99 rests on the front peripheral angle member 25 and is suitably secured thereto as by welding, riveting, or the like.

As seen from Figure 3 the internal combustion engine of this embodiment of the invention is slightly offset toward the left hand side of the vehicle in order to allow additional space at the entrance well provided at the inset frame member 72. The engine 101 is supported from a transverse channel member 102 secured to the bottom of the longitudinal channel members 75 and 76. As seen in Figure 4, the channel supporting member 102 has a drop center to give a low support for the engine 101. At its rear, the engine is supported from brackets 103, 104. It is also supported from the channels 75 and 76.

The drive shaft 105 may be supported from brackets carried by the transverse member 86. A part 106 is continued in an angular relation rearwardly to the differential for the two driven rear wheels. The drive shaft, 106, has universal joint 107 connecting the same with the shaft 105 and the differential at the rear of the vehicle. Thus the drive from the offset engine 101 is taken to the rear wheels through the centrally disposed differential.

The front axle 108 may be of the drop center type and is connected to the chassis base frame by spring 109 connected at the front ends by pivot pins directly to the sides of the channels 75 and 76. At their rear ends the springs are supported from detent brackets 111 which are also secured to the channels 75 and 76 and support a transverse shaft 112 to which the swinging spring shackle is connected. The rear springs 113 are similarly supported.

The vehicle shown in this embodiment of the invention, as well as the other embodiments herein illustrated, is particularly designed to have a low entrance and exit well and to have a low floor extending substantially at the same level the full depth of the vehicle. In order to accomplish this low level floor, the channel members 75 and 76 are cut away where they pass over the rear axle 114. As seen in Figure 4, each channel 75 and 76 is recessed as at 115 by cutting away a section of the flange of the channels, and also cutting the connecting web thereof to form a V-shaped notch in the channels. Preferably the upper flanges of the channels are not cut away. In order to compensate for the resulting weakening of the channels 75 and 76 where they pass over the rear axle, auxiliary channels 116 and 117, are positioned on top of the channels 76 and 75 to bridge the V-shaped notches 115 therein. These channels 116 and 117 are suitably secured to the upper flanges of channels 75 and 76 as by welding, riveting or the like, and additional short angle members 118 provide additional strength to the frame at this point. The floor level of the vehicle is indicated at 121 in Figure 4 which is in the plane of the upper flange of auxiliary channels 116 and 117.

From the above described construction, it will be apparent that a base frame is provided made of relatively light framing members with a very low center of gravity and with low entrance and exit wells and low floor lines. The base frame has auxiliary strengthening members, where necessary in order to support the engine 101 and at the rear thereof adjacent the rear driven wheels. This base frame, however, is not designed to carry the entire load of the vehicle body and the passengers thereof, but is adapted to be associated with a body, wherein mutual support is given by the body to the frame and by the frame to the sides, ends and roof of the body.

In Figures 5 and 6 a slightly modified base frame construction is shown which is particularly adapted for use as a single motored trackless trolley vehicle. These vehicles are adapted to receive their motive power from overhead trolleys, the energy thus derived operating one or more electric motors for driving the vehicle. This embodiment of the invention resembles in many respects the embodiment shown in Figures 3 and 4, and similar parts will be designated by the same characters in describing Figures 5 and 6. The angle members 19 are positioned substantially within the planes of the sides of the body and are preferably integrally formed with the outwardly curved wheel wells 18' and the inset step wells 71 and 72 are similarly secured to the peripheral frame members. Similar longitudinal channel frame members 75 and 76 are used and the springs 109 and 113 are supported in the manner described in Figures 3 and 4. These channel members 75 and 76 are similarly cut away over the rear axle and auxiliary frame members 116 and 117 are used to strengthen the channels at this point. However, due to the different drive of this embodiment the bracing of the base frame differs from the embodiment shown in Figures 3 and 4.

Positioned approximately midway the length of the vehicle is the driving motor 131 which receives its electrical current from a distant power plant through an electrical trolley wire and trolley pole. The motor 131 is so supported that the upper portion thereof does not project above the floor which is mounted substantially on the level 121. Motor 131 is provided with mounting brackets 132, which are bolted to one flange of transverse Z-shaped framing members 133. Preferably rubber blocks 134 are interposed between the frame members 133 and the bracket members 132 in order to effectively insulate the motor from the base frame and to also resiliently support the same to thereby absorb vibrations of the motor. The auxiliary frame members 133 span the channel members 75 and 76, resting on the upper flanges thereof and being secured thereto by welding, riveting or the like. The ends of the auxiliary members 133 project beyond channels 75 and 76 and are secured to short auxiliary framing members 135 and 136. Members 135 and 136 are, preferably, of angle formation and have their opposite ends connected to the Z-shaped transverse members 85 and 87. These members 85 and 87 are similar to those described in connection with Figures 3 and 4 and are similarly supported.

From the above described construction, it will be seen that the electric motor 131 is resiliently suspended from and insulated from the base frame substantially centrally thereof as regards both the longitudinal and transverse axes. Furthermore the base frame adjacent the motor is so braced as to provide a rectangular support for the weight of the motor, without providing excessively heavy framing members.

As seen in Figure 5, the framing members are so arranged that cabinets 137 and 138 may be supported on opposite sides of the motor 131. These cabinets are preferably constructed in the form of a light sheet metal box member providing a bottom, end walls and rear walls for the cabinet. These cabinets 137 and 138 are preferably provided with doors which are accessible from opposite sides of the vehicle and the cabinets may be used for carrying luggage of the passengers, or for carrying auxiliary equipment of the vehicle, such as the necessary electrical switches and cutouts, door operating mechanism, relays, fuses, or brake control mechanism.

From an inspection of Figure 5, it will be noted that the framing construction at the front end of the vehicle is considerably lightened, since the auxiliary framing bracket for supporting the internal combustion engine may be omitted. Due to the low suspension of motor 131, and its balanced position with respect to the base frame and vehicle, a vehicle of excellent riding qualities is obtained.

The base frame constructions herein described in detail are materially lighter in weight than the usual chassis provided for vehicles of this nature, and may be associated with various types of body constructions, such as delivery trucks, or busses of various types which reinforce the base frame members. As heretofore disclosed the base frames are intended to be combined with passenger carrying vehicle bodies.

Referring particularly to Figures 7, 8 and 9, which are respectively a side elevation, a rear elevation and a front elevation of the preferred form of body construction for the base frame of Figures 3 and 4, a series of body members of T section are connected at both sides of the vehicle to the members 18 and 19 constituting the peripheral frame members. The front T member 201 extends completely across the roof of the vehicle and is thus of U-shape. Additional side frame members preferably of T cross section 203 to 208 also extend upwardly along the opposite sides of the vehicle and completely across the top thereof, so that the roof carlines are integral with the vertical side frame members. These members 203 to 208 are accordingly also of U formation, the two legs of the U extending downwardly on opposite sides of the vehicle. However, it will be understood that the members 203 to 208 may be formed in two halves which are suitably joined at the upper central portion of the vehicle. Members 201, 203 to 208 are bent inwardly at their ends to enter the angle of peripheral frame members 18 and 19 and are suitably secured thereto, preferably by welding. Front and rear side T members 209 do not extend across the roof of the vehicle, but may terminate at the point where the vertical sides of the vehicle merge into the curved roof.

As seen in Figure 7, additional strength is provided to the body at the front and rear ends thereof adjacent the door openings which are positioned just in front of the front wheels and to the rear of the rear wheels. The front members 201, 203, and 209 are connected by members 212 and 213, preferably of L formation. Member 212 is positioned at the top of the front door opening and is curved around the front of the body and is secured to curved T member 214. Member 214 is curved upwardly over the front and is secured at one end to U member 201 and at its other end to a flat strap 215 extending across the front of the body.

An additional horizontal framing member 216 spans the front door opening, being preferably of L formation and is secured at its rear end to the U-shaped member 201. The members 212, 213 and 216 are, preferably, securely held in position by gusset plates 217 securing said members to the U member 201. At its forward end the L member 216 is also secured to the member 214. An additional brace member comprising a strap 218 is positioned over the door opening and is curved upwardly over the edge of the body and connected to members 212, 216 and 214. By the construction just described it will be apparent that the relatively light body is securely braced at the door opening by the framing members as described.

Auxiliary bracing frame members are provided adjacent the rear end of the vehicle to provide additional support adjacent the rear door similar to the members above described adjacent the front door. These rear members are given similar reference characters to those used in describing the framing adjacent the front door.

Flat strap members 221 extend longitudinally of the vehicle along the sides thereof and these straps are secured to each of the vertical members 201 to 209. The straps 221 are positioned approximately at the base of the frame of the windows in the sides of the vehicle. The strap 221 on the left side of the vehicle is curved around the left rear corner and is continued across the back of the vehicle, as seen in Figure 8. Similarly the strap 221 on the left side of the vehicle is continued around the front thereof as seen in Figure 9.

The rear of the vehicle body is formed by a plurality of vertically positioned members 222, 223, 224 and 225, as seen in Figure 8. Members 222, 223 and 224 are curved upwardly around the roof of the vehicle and project forwardly to the rearmost U-shaped member 208 and have their ends secured to member 208. The lower ends of members 222, 223 and 224 are secured to the peripheral frame members 25 extending across the rear of the vehicle. It will be noted, however, that member 25 may be offset upwardly as seen at 25' (Figure 8) and an auxiliary frame member of L formation 226 may span the offset portion as shown. The substantially rectangular opening provided by offset member 25' and frame member 226 forms an opening into which a spare tire may be positioned in a compartment built to the rear of frame members 25' and 226.

Positioned above and parallel to strap 221 across the back of the vehicle is a strap 227 which is connected to members 222, 223, 224 and 225 and extends around the left side of the vehicle to the U-shaped member 208, to which it is secured.

As seen in Figure 9, the framing for the front of the vehicle may differ from that of the rear. The base member 25 which extends across the front of the vehicle is curved slightly upwardly to provide greater road clearance at the front of the vehicle. The straps 215 and 221 are each secured to two vertical T-shaped members 231 and 232 which terminate at the horizontal member 215 and are secured at their lower ends to the lower peripheral member 25. Additional T members 233 and 234 are secured to peripheral members 25 and to cross member 221, these members also being tied to the vertical members 231 and 232 by struts 235. The horizontal straps 215 and 221 terminate at and are secured to vertical angle member 236 which defines the forward edge of the door opening. It will be seen from Figure 3 that the door openings are both positioned at the corners of the vehicle.

It will be observed that the body frame members for the sides, ends and roof, just described, are thus firmly secured to each other and to the base frame, so that the whole constitutes an open frame of box-like character of symmetrical form. The frame members thus mutually strengthen and stiffen each other, the side, end and roof frame members constituting, in effect, longitudinal and transverse trusses that serve to stiffen the base frame in every direction, the side, end and roof members functioning in this respect like the well known trusses of a bridge. This arrangement makes it practical to use structural metal of light weight and yet utilize the base of the body to support the power plant or plants and to directly connect the running gear thereto, and constitutes an important phase of the present invention. The curve in the portions 18 of the base frame permits the floor line of the body constructed about the described frame to be located well below the tops of the road wheels that are received therein when the body is secured to the axles that interconnect the wheels at opposite sides of the body in well known manner. The transverse base frame members 85, 87, 88, 91 and 92 serve to strengthen the peripheral frame elements at the bends therein while the vertical side frame members 201, 203, 207, 208 that are rigidly attached to curved portions 18 contribute to the strength thereof so that the box-like frame is not seriously weakened by the depressions formed therein for the wheels. It will be noted that the frame at the door openings is provided with supplementing frame members so that the whole body frame is not materially weakened by the provision of such necessary openings. The frame just described derives much of its rigidity, strength and ability to resist torsional stresses from the fact that it is symmetrical, that is, that the width and heighth is substantially the same from end to end and the wheel recesses are each located equidistantly from an end and the center of the body. The door openings are also symmetrically disposed adjacent the ends at points at which the body frame is best adapted to receive them.

Referring to Figures 10 and 11, a preferred mode of constructing the body upon the base frame of Figures 1 and 2 is illustrated. In vehicles of this type, in which the motors are supported midway of the length of the body, so that the ends of the body that extend beyond the axles do not primarily sustain the weight, the ends may be of simpler construction and include fewer structural members. One end of a body of this type is illustrated in said figures. The opposite end may be the same, or may be modified to meet particular conditions that may arise.

In this embodiment of the invention the frame elements 18, 19 and 23 and 24, located substantially in the planes of the sides of the body are joined by U-shaped bars 301, preferably of T-shape in cross section. The mid portions of these bars constitute the roof carlines as in the form of the invention shown in Figures 7, 8 and 9. The bars are arranged at intervals along the length of the body sides, and are interconnected at each side by a member 302, of suitable cross sectional form. The latter may be made to extend continuously along substantially each entire side, being interrupted only at the door openings, or said member may be made in sections as desired. The member 302 preferably is located so as to define the lower edges of the window openings in the body, and serves, with the side and roof sheathing or panels which are rigidly secured to the members 301 and 302 to rigidly unite all of said members to form a unitary construction that serves to stiffen the base frame and so that the frame of the sides and roof serves as a truss for said base. Moreover, each part of the side, roof or base frame mutually contributes to the strength of the other parts so that though light-weight material is used, the whole possesses great strength. The member 301, nearest the end of the body, is connected to the end frame member 25 forming a part of the base frame and located substantially in the planes of the end of the body, by bars 302' that are connected at one end to the base frame and that are curved toward said member 301 along the roof line, being attached to said last named member at the points of crossing in any approved manner. The opposite ends of the bars 302' beyond member 301 are connected to a roof carline 303, which is rigidly attached at its ends to longitudinal members 304 that extends across three of the members 301 and is rigidly secured to said members. A further carline 305 secured at its ends to members 304 at the opposite sides of the body and to the adjacent member 301 as by a gusset plate 306 serves to further strengthen and stiffen the body frame adjacent the ends thereof.

The bars 302' are connected to each other and to the nearest member 301 by further bars 307 extending around the end of the body and being rigidly secured to nearest member 301 and bars 302'. The base frame end member 25 is offset upwardly and forms with an angle or similar brace 308 a frame for an opening in the completed body through which spare tires are stored in a compartment built to the rear thereof. A vertically-disposed bar 309 rigidly connects offset portion 25 to the bars 307 and a further transverse member 310 further serves to rigidly connect bars 302' and 309 above offset portion 25 so as to further stiffen and strengthen the frame at this part thereof. Further longitudinal members 311 connect the upper bar 307 with the end carline 303, said members following the contour of the upper corner of the end of the body.

Referring to Figures 12 and 13 a further modification of a body frame is shown in which cross members 401, similar to members 301, interconnect the side base frame portions 18, 19 at each side of the vehicle. Said members may be disposed relatively close together adjacent the edge of the door opening nearest the wheel recesses so as to provide exceptional strength at this point. This is desirable, if the power plant is disposed in an end of the body so that the weight thereof must be sustained by the portion of the body that projects forwardly of the nearest axle. Longitudinal members 402 interconnect members 401 to maintain them in proper spaced relation. The end member 401 is rigidly attached to members 403, the latter being connected at one end to the end base frame member 25 and extend beyond their point of connection with member 401 where their ends are rigidly secured to a carline 404. The ends of the carline are respectively secured to a longitudinal member 405 disposed above the door opening and to a member 406 that may extend across the end and around the side opposite the door opening to the member 401 beyond said opening. The member 406 extends completely around the end of the body from the member 401 at the edge of the door opening nearest the end of the vehicle to the member 401 at the other side of the body that is disposed at a point opposite the edge of the door opening nearest the adjacent wheel recess. Member 405 is secured at one end to the nearest vertically disposed member 403 and at its opposite end to member 401 that connected the portions 18 of the base side frame elements as illustrated, being connected to the further members 401 at the points of intersection. A gusset plate 407 may be used to facilitate such connection and to maintain the right angular relation of the members at these points.

A further bar 408 paralleling the member 406 extends around the end of the body rigidly connecting the members 401 and 403 in definite spaced relation. A vertically disposed member 409 rigidly connects members 405, 406, 408 and end base frame member 25.

The frame for the entire carrier opening in the end is formed by attaching the ends of an inverted U-shaped angle or similar bar 410 to end base frame member 25. The mid portion of said bar is connected to members 408 and 406 by a brace 411 and said bar is further secured to said member 408 by further brace member 412. Further strengthening members 413 connect member 406 and the nearest cross member 401.

It will be understood that the constructions just described are merely examples of preferable ways of carrying out the present invention, and that many other combinations of transverse and longitudinal members may be used, the essential characteristic being that the side frame, end frame, roof frame and base frame members be rigidly united so as to mutually support and strengthen each other, the sheathing and floor for the frame further contributing to the capability of the base of the body to support the power plant and accessories and to serve as a means for the direct attachment of the axles thereto by means of the usual springs. The frame of the body is accordingly the only frame of the vehicle and no separate chassis frame members designed so as to alone sustain the load of the vehicle need be used, thus cheapening the construction, largely reducing the weight and yet providing a body of extraordinary rigidity and strength. This mode of constructing a road vehicle is peculiarly well adapted to serve the purposes for which it is so constructed because of the symmetrical ends and the disposition of the wheel receiving recesses at points substantially equally spaced from the ends and center of the body.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A passenger carrying motor vehicle comprising a substantially rectangular body including a rectangular frame formed of two central members and side and end frame members positioned substantially in the planes of the sides and ends of the body, a plurality of transverse frame members connecting the central and side members, said side frame members being curved to define wells for vehicle wheels, one side member being interrupted in front of the front well therein to provide a door opening, an auxiliary side frame member inset at and spanning said door opening to provide a step-well support, said auxiliary member being connected to one wheel well and to the adjacent end frame member, said side and end frame members being in a plane below the plane defined by said central frame members; and a floor on said central frame members above the level of said auxiliary frame member.

2. A passenger carrying motor vehicle comprising a substantially rectangular body including a rectangular frame formed of two central members and side and end frame members positioned substantially in the planes of the sides and ends of the body, a plurality of transverse frame members connecting the central and side members, said side frame members being curved to define wells for vehicle wheels adjacent the front and rear of the vehicle, one side member being interrupted in front of the front well therein and in the rear of the rear well therein to provide door openings, auxiliary side frame members inset at and spanning said door openings to provide step-well supports, said side and end frame members being in a plane below the plane defined by said central frame members; and a floor on said central frame members above the level of said auxiliary frame member.

3. A passenger carrying motor vehicle comprising a substantially rectangular body including a rectangular frame formed of two central members and side and end frame members positioned substantially in the planes of the sides and ends of the body, a plurality of transverse frame members connecting the central and side members, said side frame members being curved to define wells for vehicle wheels adjacent the front and rear of the vehicle, one side member being interrupted adjacent the front and rear corners of the body to provide door openings, said front door opening being positioned at the junction of one side and end frame member and angularly arranged with respect to the longitudinal axis of the vehicle, auxiliary side frame members inset at and spanning said door openings to provide step-well supports, said side and end frame members being in a plane below the plane defined by said central frame members; and a floor on said central frame members above the level of said auxiliary frame member.

4. A road vehicle comprising a body, a base frame having two longitudinal frame members extending substantially the full length of the vehicle and spaced substantially equidistant from the center line of the vehicle, a plurality of transverse frame members secured to said longitudinal members and extending beyond the same, a pair of side frame members substantially in the planes of the sides of the body and secured to said transverse frame members, one of said side frame members being interrupted adjacent the front and rear of the vehicle to provide door openings, and auxiliary frame members secured to said transverse members spanning the door openings and set back to provide inset step-wells for the door openings.

5. A road vehicle comprising a body, a base frame having two longitudinal frame members extending substantially the full length of the vehicle and spaced substantially equidistant from the center line of the vehicle, a plurality of transverse frame members secured to said longitudinal members and extending beyond the same, a pair of side frame members substantially in the planes of the sides of the body and secured to said transverse frame members, said side frame members being curved over the front and rear wheels to provide wheel recesses of substantial depth so as to provide a low body floor line, one of said side frame members being interrupted to provide a door opening, and an auxiliary frame member secured to said transverse members spanning the door opening and set back to provide an inset step-well for the door opening.

6. A passenger carrying body frame designed to support the weight of the power plant and accessories of a road vehicle and to have the springs that connect the body to the supporting axles directly connected thereto, comprising a base frame including elements in the outline and plan of the body, said elements in the plane of the sides of the body being curved to provide wheel recesses, said frame element of the base frame being inset from one side of the body frame to facilitate the formation of a step well, supplemental bracings to supplement the strength of the body at said well and frame members for the sides and ends of the body including vertically disposed members secured to said element, and horizontally disposed members connecting said vertically disposed members so that said vertically and horizontally disposed members provide a truss-like structure which supplements the strength of the base frame, whereby relatively light structural material may be used in the construction of said body frame.

7. A road vehicle body frame comprising a base frame having frame elements arranged to form a closed figure, other frame members constituting frame members of the sides and ends of the body, said base frame elements constituting a lower frame element for said side and end frames, said base frame elements that constitute the frame elements of the side frames of the body being curved to provide wheel recesses of substantial depth, one of said side base frame elements being interrupted to provide a door opening, an auxiliary side frame member inset at and spanning said door opening to provide a step support, reinforcing base frame members connecting said frame elements, and a floor on said reinforcing frame members above the level of said auxiliary frame members.

8. A road vehicle comprising a body, a base frame for said body having a pair of side frame members substantially in the planes of the sides of the body, a plurality of transverse frame members secured to said side frame members, a plurality of longitudinal reinforcing frame members secured to said transverse members, said side frame members being curved over the front and rear wheels to provide wheel recesses of substantial depth, to thus provide a low body floor line, one of said frame members being interrupted to provide a door opening, and an auxiliary frame member secured to said transverse members spanning the door opening and set back to provide an inset step support for the door opening.

WILLIAM B. FAGEOL.